May 19, 1959

H. L. ANGUS 2,887,226

COMBINE ATTACHMENT

Filed Feb. 15, 1956

Harvey L. Angus
INVENTOR.

May 19, 1959
H. L. ANGUS
2,887,226
COMBINE ATTACHMENT
Filed Feb. 15, 1956
2 Sheets-Sheet 2
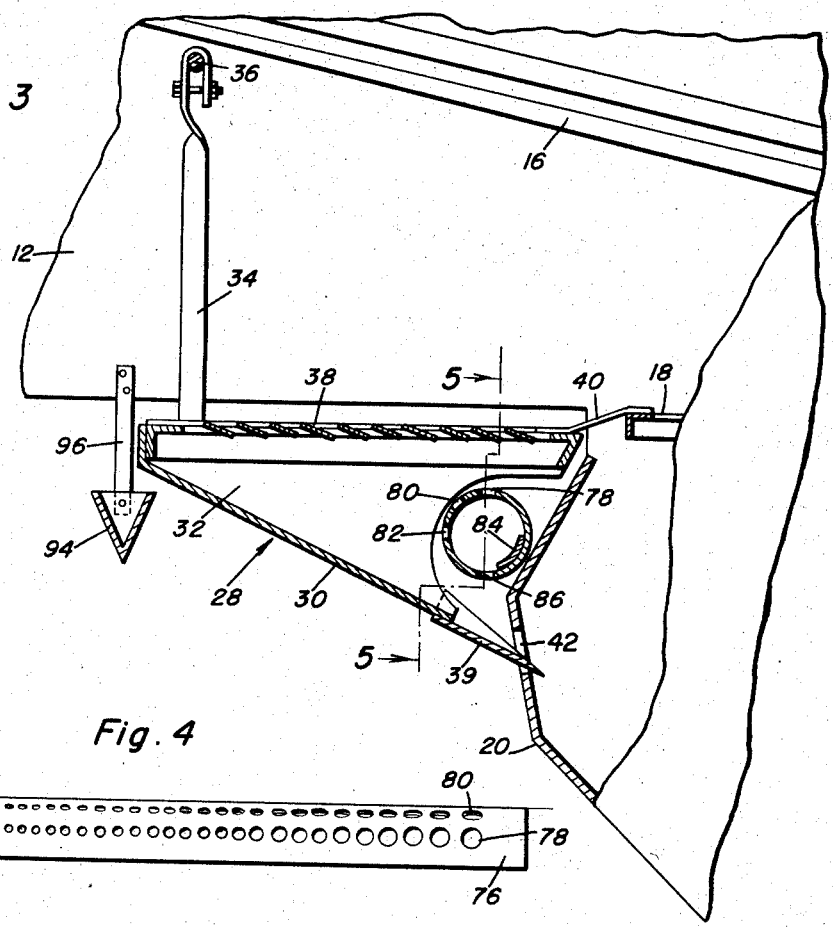
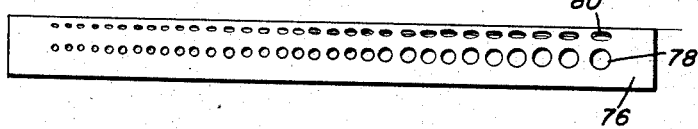
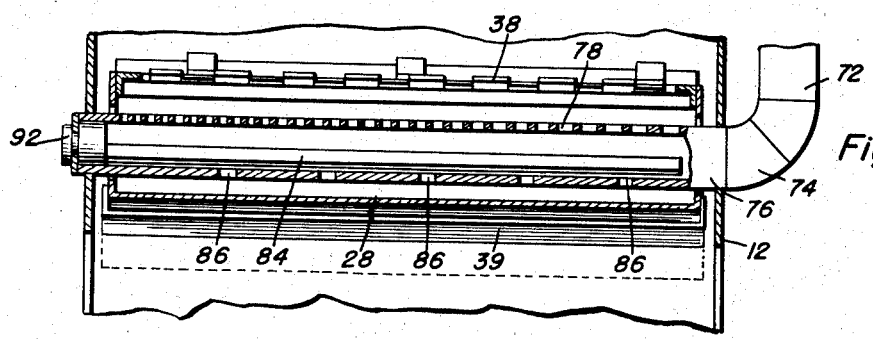
Harvey L. Angus
INVENTOR.

United States Patent Office 2,887,226
Patented May 19, 1959

2,887,226
COMBINE ATTACHMENT
Harvey L. Angus, Havre, Mont.
Application February 15, 1956, Serial No. 565,645
4 Claims. (Cl. 209—139)

This invention relates in general to new and useful improvements in farm equipment, and more specifically to an improved grain saving attachment for combines.

The modern combine is constructed whereby the various components thereof may be adjusted to compensate for variations in conditions such as volume of grain, ripeness of grain, atmospheric conditions, etc. When the various components of the combine are properly adjusted, there is a minimum of loss. However, even in a field of grain the conditions of the grain may vary with the result that the combine is not properly set to handle such grain and a larger amount of grain is normally wasted. Inasmuch as the shut-down time required for the adjustment would not be warranted by the saving of the grain, the average combine does not operate at its peak efficiency with the result that at least a small amount of grain is lost where it may otherwise have been saved. Therefore the primary object of this invention is to provide an attachment for combines which is so constructed whereby it may receive a major portion of the normally wasted grain and will remove the chaff and what little straw there may be mixed with the grain and return the grain to the interior of the combine for saving.

Another object of this invention is to provide an improved grain saving attachment for combines which is in the form of a grain tray and chaffer mounted rearwardly of the shaker beneath the straw walker for receiving chaff, straw and normally wasted grain, there being provided an auxiliary blower for removing a major portion of the chaff and straw from the normally wasted grain thereby permitting relatively clean grain to return into the combine for removal by the return auger thereof.

Still another object of this invention is to provide an auxiliary chaffer for use in combination with a combine, the chaffer being so mounted whereby normal wasted grain is saved, the chaffer being positioned rearwardly of the shaker to be pivotally mounted so that access to the shaker is permitted.

A further object of this invention is to provide an improved blower assembly for a grain saving attachment, the blower assembly including a blower pipe having longitudinally spaced apertures arranged in circumferentially spaced rows, the sizes of the apertures varying in the different rows so as to progressively remove chaff and straw from the chaffer.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 3 is an enlarged fragmentary vertical sectional view taken through the rear portion of the combine and shows the specific details of the grain saving attachment mounted therein;

Figure 4 is an enlarged elevational view of the blower pipe mounted beneath the shaker for blowing straw and chaff from the grain deposited thereon;

Figure 5 is an enlarged fragmentary sectional view taken substantially upon the plane indicated by the section line 5—5 of Figure 3 and shows further the details of the relationship between the blower pipe and the shaker; and Figure 6 is an enlarged exploded perspective view of a control device for varying the air flow from the blower pipe.

Figure 1:
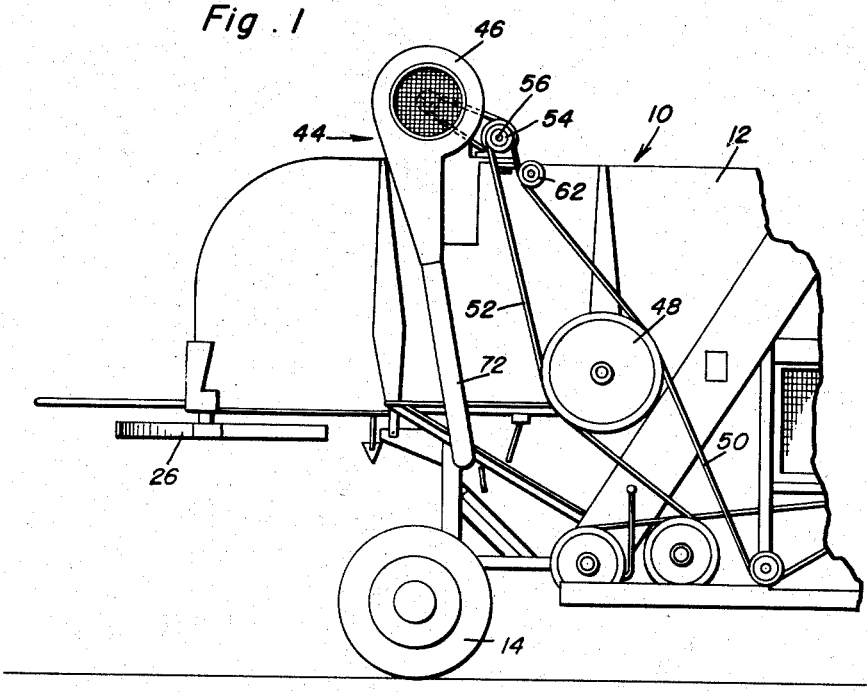
Figure 1 is a fragmentary side elevational view of the rear portion of a conventional type of combine and shows mounted thereon the grain saving attachment which is the subject of this invention, there being illustrated primarily the features of the blow assembly and the manner in which it is driven.
Figure 2:
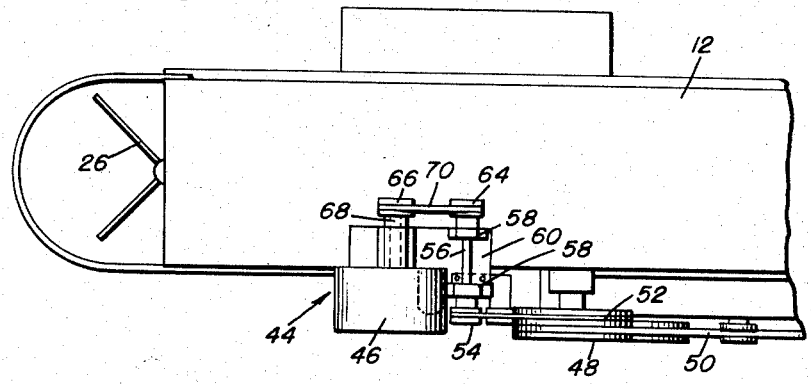
Fig. 2 is a fragmentary top plan view of the rear portion of the combine of Figure 1 and shows further the details of the combine.

Referring now to the drawings in detail, it will be seen that there is illustrated a conventional combine which is referred to in general by the reference numeral 10. Among other features, the combine 10 includes a frame 12 which is supported at the rear thereof by suitable rear wheels 14. Mounted within the upper rear portion of the frame 12 is a last straw walker 16. Mounted beneath the straw walker 16 and forwardly thereof is a last shaker or shaker shoe 18. The frame 12 includes a delivery chute 20 which is formed below the shaker 18 and in which there is mounted a return auger (not shown). The combine 10 further includes a broadcaster 26 for spreading the straw and chaff normally exiting at the rear of the combine 10.

Referring now to Figure 3 in particular, it will be seen that there is mounted within the frame 12 of the combine 10 rearwardly of the shaker 18 a grain saving attachment, which is the subject of this invention, the grain saving attachment being referred to in general by the reference numeral 28. The grain saving attachment 28 includes horizontally disposed supplemental chaffer 38 disposed slightly rearwardly of and below the shaker 18 and below the straw walker 16 whereby it receives normally wasted grain together with chaff and certain amount of straw from both the shaker 18 and the straw walker 16.

The chaffer 38 is mounted for movement with and by the shaker 18 and is suspended from the frame 12 by means of a pair of vertically extending straps 34 which are connected to opposite sides of the frame of the chaffer 38 adjacent the rear ends thereof. The upper ends of the straps 34 are received over and are pivotally carried by a transverse bar 36 which extends between the sides of the frame 12. The forward portion of the frame of the chaffer 38 is connected to the shaker 18 by means of suitable straps 40 which retain the chaffer 38 in the relative position with respect to the shaker 18 as illustrated in Figure 3.

The grain saving attachment 38 also includes a downwardly sloping supplemental grain tray 30 which has vertically extending side walls 32. The side walls 32 are secured to the frame of the chaffer 38 so that the chaffer 38 supports the grain tray 30. The lower and forward end of the grain tray 30 terminates in an extension 39 of the size to fit the particular combine to which the grain saving attachment 28 is attached.

It is pointed out at this time that the delivery chute 20 is provided with an opening 42 in the rear part thereof of a size to permit the rearward swinging of the grain tray 30 and the chaffer 38. This is accomplished by removing the straps 40 from the shaker 18. After this has been accomplished, access to the shaker 18 is obtained for the purpose of adjusting the same, as is deemed necessary.

Normally the chaffer 38 receives chaff and what grain that normally passes from the shaker 18. Also, a small amount of straw, chaff and grain may drop down from the straw walker 16. In order that the straw and chaff may be separated from the grain caught by the chaffer 38, it is necessary that there be provided a suitable supplemental blower assembly which is referred to in general by the reference numeral 44. The blower assembly 44 includes a suitable blower 46 which is mounted on the upper part of the frame 12 adjacent the rear thereof. The drive assembly of the combine 10 includes a double pulley 48 which is driven by a drive belt 50. Also, entrained over one of the pulley segments of the double pulley 48 is a drain belt 52 which has its opposite end entrained over a pulley 54. The pulley 54 is carried by a shaft 56 suitably journeled in a pair of bearing assemblies 58 carried by a mounting plate 60. An idler pulley 62 retains the belt 52 in a tension state at all times.

The mounting plate 60 forms a support for the blower 46 and is suitably secured to the top of the frame 12. The shaft 56 has mounted thereon a second pulley 64 which is aligned with a pulley 66 on the drive shaft 68 of the blower 46. A drive belt 70 connects the pulleys 64 and 66.

Extending downwardly from the blower 46 is an air supply pipe 72 which is provided at the lower end thereof with an elbow 74. Connected to the elbow 74 is a blower pipe 76 which extends transversely of the frame 12 and is suitably mounted within the interior thereof forwardly of the grain tray 30, as is best illustrated in Figure 3. The upper and rear portion of the blower pipe 76 is provided with a plurality of longitudinally spaced apertures which are arranged in circumferentially spaced rows 78, 80 and 82. The apertures of the rows 78, 80 and 82 are similarly arranged and progressively vary in size from one end of each row to the other, the larger apertures being disposed adjacent the elbow 74. Thus air passing out through the rows of apertures 78, 80 and 82 will be evenly distributed to the chaffer 38 and move such chaff and straw as may be on the chaffer 38 rearwardly to the broadcaster 26. At the same time, the normally wasted grain will drop down upon the grain tray 30 and then be returned to the return auger.

In order that the volume of air passing out through the apertures 78, 80 and 82 may be controlled, there is mounted within the blower pipe 76 a flow control member 84. The bottom of the blower pipe 76 is provided with vent openings 86 which are normally covered by the flow control member 84. By rotating the flow control member 84 transversely of the combine 10, as is best illustrated in Figure 3, the amount the vent openings are uncovered may be controlled so as to control the volume of air flowing from the blower pipe 76. The positioning of the flow control member 84 is made possible by means of a handle 92.

Although the grain saving attachment 28 will return a major portion of the grain which is normally wasted by the combine 10 to the return auger, its effectiveness should be checked from time to time. Accordingly, in order that the grain which may be wasted by the grain saving attachment 28 may be determined, there is provided a suitable sample collector in the form of a transversely extending tray 94. The tray 94 is disposed rearwardly of and slightly below the rear edge of the chaffer 38 in position for receiving refuse exiting therefrom. The tray 94 is suspended from the frame 12 by suitable hangers 96 disposed at opposite ends of the refuse tray 94. Inasmuch as the top of the grain tray 94 is open, one may readily reach therein in order to sample the refuse collected thereby to determine if grain is being lost.

From the foregoing, it will be readily apparent that there has been provided an attachment for a combine which is of a relatively simple construction and at the same time serves the purpose of collecting a major portion of the grain which is normally lost through present day combine operations. Inasmuch as the present invention may be readily attached to a combine at relatively low cost, the cost of the invention is greatly outweighed by the amount of grain which it will save.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to falling within the scope of the invention as claimed.

What is claimed as new is as follows:

1. A grain saving attachment for combines of the conventional type including a rear frame portion having a bottom opening for the discharge of straw and chaff, a rear delivery chute disposed immediately forwardly of said bottom opening and extending downwardly and forwardly therefrom, a shaker extending into said rear frame portion adjacent said bottom opening for delivering chaff therethrough, said shaker terminating forwardly of said rear delivery chute, said grain saving attachment comprising a supplement chaffer mounted externally of said combine below said bottom opening and rearwardly of said rear delivery chute for receiving chaff and normally wasted grain from said shaker, a supplemental blower assembly including a blower pipe disposed rearwardly of said rear delivery chute and below said chaffer for removing said chaff from said chaffer and permitting said normally wasted grain to drop through said chaffer, a supplemental grain tray disposed below said chaffer and opening into said rear delivery chute for receiving said normally wasted grain and delivering said grain to said delivery chute.

2. A grain saving attachment for combines of the conventional type including a rear frame portion having a bottom opening for the discharge of straw and chaff, a rear delivery chute disposed immediately forwardly of said bottom opening and extending downwardly and forwardly therefrom, a shaker extending into said rear frame portion adjacent said bottom opening for delivering chaff therethrough, said shaker terminating forwardly of said rear delivery chute, said grain saving attachment comprising a supplement chaffer mounted externally of said combine below said bottom opening and rearwardly of said rear delivery chute for receiving chaff and normally wasted grain from said shaker, a supplemental blower assembly including a blower pipe disposed rearwardly of said rear delivery chute and below said chaffer for removing said chaff from said chaffer and permitting said normally wasted grain to drop through said chaffer, a supplemental grain tray disposed below said chaffer and opening into said rear delivery chute for receiving said normally wasted grain and delivering said grain to said delivery chute, and means connecting said chaffer to said shaker for actuation therewith.

3. A grain saving attachment for combines of the conventional type including a rear frame portion having a bottom opening for the discharge of straw and chaff, a rear delivery chute disposed immediately forwardly of said bottom opening and extending downwardly and forwardly therefrom, a shaker extending into said rear frame portion adjacent said bottom opening for delivering chaff therethrough, said shaker terminating forwardly of said rear delivery chute, said grain saving attachment comprising a supplement chaffer mounted externally of said combine below said bottom opening and rearwardly of said rear delivery chute for receiving chaff and normally wasted grain from said shaker, a supplemental blower assembly including a blower pipe disposed rearwardly of said rear delivery chute and below said chaffer for removing said chaff from said chaffer and permitting said normally wasted grain to drop through said chaffer, a supplemental grain tray disposed below said chaffer and opening into said rear delivery chute for receiving said normally wasted grain and delivering said grain to said delivery chute, said grain tray and said chaffer being pivotally mounted for swinging movement to permit access to said shaker.

4. A grain saving attachment for combines of the conventional type including a rear frame portion having a bottom opening for the discharge of straw and chaff, a rear delivery chute disposed immediately forwardly of said bottom opening and extending downwardly and forwardly therefrom, a shaker extending into said rear frame portion adjacent said bottom opening for delivering chaff therethrough, said shaker terminating forwardly of said rear delivery chute, said grain saving attachment comprising a supplement chaffer mounted externally of said combine below said bottom opening and rearwardly of said rear delivery chute for receiving chaff and normally wasted grain from said shaker, a supplemental blower assembly including a blower pipe disposed rearwardly of said rear delivery chute and below said chaffer for removing said chaff from said chaffer and permitting said normally wasted grain to drop through said chaffer, a supplemental grain tray disposed below said chaffer and opening into said rear delivery chute for receiving said normally wasted grain and delivering said grain to said delivery chute, and a sample pan for sampling refuse passing over said chaffer to determine whether grain is being lost.

References Cited in the file of this patent

UNITED STATES PATENTS

| | | |
|---|---|---|
| 1,392,094 | Toler | Sept. 27, 1921 |
| 1,669,686 | Worthington | May 15, 1928 |
| 1,835,327 | Paradise | Dec. 8, 1931 |